(12) United States Patent
Nishikawa

(10) Patent No.: US 11,932,772 B2
(45) Date of Patent: Mar. 19, 2024

(54) WATER-RESISTANT GAS BARRIER FILM, AND METHOD FOR PRODUCING WATER-RESISTANT GAS BARRIER FILM

(71) Applicant: TOPPAN PRINTING CO., LTD., Tokyo (JP)

(72) Inventor: Takeshi Nishikawa, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 45 days.

(21) Appl. No.: 17/176,682

(22) Filed: Feb. 16, 2021

(65) Prior Publication Data

US 2021/0163777 A1 Jun. 3, 2021

Related U.S. Application Data

(63) Continuation of application No. PCT/JP2019/031739, filed on Aug. 9, 2019.

(30) Foreign Application Priority Data

Aug. 22, 2018 (JP) .................................. 2018-155306

(51) Int. Cl.
  *B32B 27/30* (2006.01)
  *B32B 27/08* (2006.01)
  (Continued)

(52) U.S. Cl.
  CPC ............ *C09D 129/04* (2013.01); *B32B 27/08* (2013.01); *B32B 27/28* (2013.01); *B32B 27/306* (2013.01);
  (Continued)

(58) Field of Classification Search
  CPC .. C09D 129/04; C09D 129/02; C09D 131/04; C09D 179/02; B32B 27/306;
  (Continued)

(56) References Cited

U.S. PATENT DOCUMENTS 4,650,721 A * 3/1987 Ashcraft ................. B32B 27/08
                                                      156/244.11
5,547,764 A * 8/1996 Blais ..................... C09D 129/04
                                                      428/688

(Continued)

FOREIGN PATENT DOCUMENTS

JP    2004-217766 A    8/2004
JP    2008-284756   *  11/2008   ............. B32B 27/30

(Continued)

OTHER PUBLICATIONS

International Searching Authority, "International Search Report," issued in connection with International Patent Application No. PCT/JP2019/031739, dated Oct. 21, 2019.

(Continued)

*Primary Examiner* — Michael C Romanowski
(74) *Attorney, Agent, or Firm* — Foley & Lardner LLP

(57) ABSTRACT

A water-resistant gas barrier film is provided with a gas barrier layer at least disposed on a substrate film. The gas barrier layer is made from coating liquid comprising (a) at least one of carboxy group-modified polyvinyl alcohol and partially saponified polyvinyl alcohol, (b) completely saponified polyvinyl alcohol, and (c) polyethyleneimine.

5 Claims, 1 Drawing Sheet

(51) Int. Cl.
  *B32B 27/28* (2006.01)
  *C08J 5/18* (2006.01)
  *C08J 7/04* (2020.01)
  *C08L 29/04* (2006.01)
  *C09D 129/04* (2006.01)
  *C09D 179/02* (2006.01)

(52) U.S. Cl.
  CPC ............... *C08J 5/18* (2013.01); *C08L 29/04* (2013.01); *C09D 179/02* (2013.01); *B32B 2255/26* (2013.01); *B32B 2307/51* (2013.01); *B32B 2307/7242* (2013.01); *B32B 2307/73* (2013.01); *C08J 2329/04* (2013.01); *C08J 2379/02* (2013.01)

(58) Field of Classification Search
  CPC ............ B32B 2255/10; B32B 2250/02; B32B 2329/00; B32B 2329/04; B32B 27/36; B32B 2255/26; B32B 27/08; B32B 27/18; B32B 2307/7242; B32B 2307/7244; C08F 216/06; C08F 218/08; C08F 222/06; C08F 16/06; C08L 29/04; C08L 31/04; C08L 2205/02; C08L 2205/025; C08L 2205/03; C08J 5/18; C08J 7/043; C08J 7/048; C08J 2429/04; C08J 2329/04
  USPC .................. 428/36.6, 35.4, 34.1–36.92
  See application file for complete search history.

(56) References Cited

U.S. PATENT DOCUMENTS

| | | | | |
|---|---|---|---|---|
| 7,259,122 | B1* | 8/2007 | Lombardi | B01J 35/004 |
| | | | | 502/103 |
| 2007/0087131 | A1* | 4/2007 | Hutchinson | C08J 7/046 |
| | | | | 427/533 |
| 2010/0323189 | A1* | 12/2010 | Illsley | C09D 129/04 |
| | | | | 428/354 |
| 2011/0081512 | A1* | 4/2011 | Noda | B32B 27/08 |
| | | | | 428/355 R |
| 2014/0227544 | A1* | 8/2014 | Inoue | C09D 171/02 |
| | | | | 428/483 |
| 2016/0326285 | A1* | 11/2016 | Mori | C08J 5/18 |
| 2016/0369072 | A1* | 12/2016 | Yamaguchi | C08F 116/06 |
| 2018/0245028 | A1* | 8/2018 | Ookubo | B65D 65/46 |
| 2020/0136145 | A1* | 4/2020 | Ohta | H01M 4/0404 |
| 2021/0292452 | A1* | 9/2021 | Ieda | C08K 5/053 |

FOREIGN PATENT DOCUMENTS

| | | | |
|---|---|---|---|
| JP | 2008-284756 A | 11/2008 | |
| JP | 2015-232104 A | 12/2015 | |
| WO | WO-9312924 A1 * | 7/1993 | .......... B29C 55/026 |
| WO | WO-2013/129520 A1 | 9/2013 | |

OTHER PUBLICATIONS

International Searching Authority, "Written Opinion," issued in connection with International Patent Application No. PCT/JP2019/031739, dated Oct. 21, 2019.
First Chinese Office Action issued in connection with CN Appl. Ser. No. 201980054489.1 dated Aug. 24, 2022.

* cited by examiner

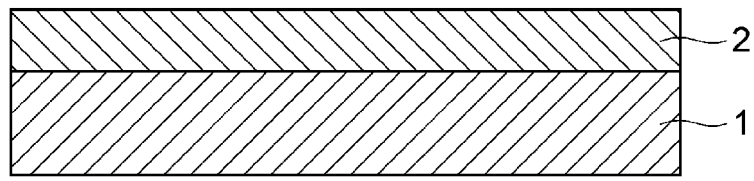

WATER-RESISTANT GAS BARRIER FILM, AND METHOD FOR PRODUCING WATER-RESISTANT GAS BARRIER FILM

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/031739, filed on Aug. 9, 2019, which is based upon and claims the benefit of priority to Japanese Patent Application No. 2018-155306, filed on Aug. 22, 2018, the disclosures of which are incorporated herein by reference in their entireties.

TECHNICAL FIELD

The present invention relates to a gas barrier film, and particularly relates to a water-resistant gas barrier film and a method for producing the same.

BACKGROUND

Various packaging materials having gas barrier properties, such as oxygen barrier properties, have been developed. In recent years, many proposals have been made for gas barrier films in which a nanoscale metal oxide film such as silicon oxide or aluminum oxide is formed on a plastic substrate.

However, forming a metal oxide film generally requires a vacuum film forming apparatus and related manufacturing equipment for performing vapor deposition, ion plating, and the like, which are expensive.

Although packaging materials are required worldwide these days, inexpensive barrier materials that can be processed by printing machines etc. are increasingly necessary in order to supply packaging materials at low cost. Polyvinylidene chloride has been conventionally used to produce oxygen barrier properties, however, the amount thereof used has been reduced because it produces harmful substances during incineration. Ethylene vinyl alcohol films are also widely used for packaging; however, they are expensive.

Therefore, for example, as shown in PTL 1, a method for coating a thin film to a material using polyvinyl alcohol and an inorganic layered mineral has been proposed. While excellent gas barrier properties are obtained with this configuration, further studies are needed to obtain adhesion properties having water resistance properties at the same time.

CITATION LIST

Patent Literature

PTL 1: WO-2013/129520-A1

SUMMARY OF THE INVENTION

Technical Problem

In consideration of the above problems, an object of the present invention is to provide a novel gas barrier film having oxygen barrier properties and water resistance. Another object of the present invention is to provide a method for producing the water-resistant gas barrier film.

Solution to Problem

A water-resistant gas barrier film according to one aspect of the present disclosure is provided with at least a gas barrier layer disposed on a substrate film. The gas barrier layer is formed from a coating liquid comprising (a) at least one of carboxy group-modified polyvinyl alcohol and partially saponified polyvinyl alcohol, (b) completely saponified polyvinyl alcohol, and (c) polyethyleneimine.

In one embodiment, the partially saponified polyvinyl alcohol and the completely saponified polyvinyl alcohol may have a polymerization degree of 3000 or less.

In one embodiment, a content of the polyethyleneimine may be in an amount of 10 mass % or less with reference to the total amount of the gas barrier layer.

In one embodiment, the polyethyleneimine may have a weight average molecular weight of 500 or more.

In one embodiment, the carboxy group-modified polyvinyl alcohol may be a saponified product of a copolymer of a vinyl ester monomer and a carboxy group-containing monomer.

In one embodiment, the water-resistant gas barrier film may be a sequentially stretched film.

A method for producing a water-resistant gas barrier film according to one aspect of the present disclosure comprises the steps of: applying, to a substrate film, a coating liquid comprising (a) at least one of carboxy group-modified polyvinyl alcohol and partially saponified polyvinyl alcohol, (b) completely saponified polyvinyl alcohol, and (c) polyethyleneimine; and drying the applied coating liquid by heating to form a coating film on the substrate film.

In one embodiment, the method for producing a water-resistant gas barrier film may further comprise a step of stretching the substrate film together with the coating film.

In one embodiment, the stretch ratio in the stretching step may be 2 to 20 times.

Effect of the Invention

The present invention provides a novel gas barrier film having oxygen barrier properties and water resistance. The present invention also provides a method for producing the water-resistant gas barrier film. Coating liquid containing polyvinyl alcohol and polyethyleneimine, in which the polyvinyl alcohol is at least partially carboxy group-modified polyvinyl alcohol or partially saponified polyvinyl alcohol, is used. Thereby, a gas barrier film having water-resistant adhesion can be provided. The gas barrier film in the present invention provided with a stretchable polyvinyl alcohol-based coating film is inexpensive as a packaging material, and can be processed by a printing machine or the like.

BRIEF DESCRIPTION OF THE DRAWINGS

The FIGURE is a schematic cross-sectional view showing a water-resistant gas barrier film according to one embodiment.

DETAILED DESCRIPTION

Embodiments of the present invention of will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

<Water-Resistant Gas Barrier Film>

Hereinafter, one embodiment of the present invention will now be described with reference to the drawing. The FIGURE is a schematic cross-sectional view showing a water-resistant gas barrier film according to one embodiment. A water-resistant gas barrier film 10 is provided with a substrate film 1 and a gas barrier layer 2 disposed on the substrate film 1 for imparting gas barrier properties to the substrate film. The gas barrier layer 2 is composed of specific components and has improved or even excellent water resistance.

(Substrate Film)

Usable examples of the substrate film 1 include, but are not limited to, films made of polyethylene terephthalate, polybutylene terephthalate, polyethylene naphthalate, polyamide, polypropylene, polycarbonate, cycloolefin, or the like. These materials may be amorphous. The substrate film may be a stretched film or a non-stretched film. However, the substrate film is preferably a stretched film because the stretched film has improved or even excellent mechanical properties, such as tensile strength, and heat resistance. If necessary, the substrate film may be stretched only in a uniaxial direction (e.g., the MD direction).

The thickness of the substrate film 1 is not particularly limited, but is desirably a general thickness of approximately 3 μm or more and 100 μm or less.

(Gas Barrier Layer)

The gas barrier layer 2 includes polyvinyl alcohol and polyethyleneimine, and the polyvinyl alcohol at least partially includes carboxy group-modified polyvinyl alcohol or partially saponified polyvinyl alcohol. That is, the gas barrier layer 2 is made from a coating liquid provided with (a) at least one of carboxy group-modified polyvinyl alcohol and partially saponified polyvinyl alcohol, (b) completely saponified polyvinyl alcohol, and (c) polyethyleneimine. More specifically, the gas barrier layer 2 denotes a product obtained by heat drying the coating liquid (heat-dried product).

In general, a coating film composed of only (completely saponified) polyvinyl alcohol containing only a hydroxyl group has a problem that although it can be closely adhered to a substrate by an ionic bonding, the bonding is easily dissociated due to the involvement of water. Therefore, it is necessary to introduce a substance having another functional group to bring about a strong bond with the substrate; however, simply adding a material that easily bonds with a hydroxyl group leads to precipitation and reduction of pot life.

For solving this problem, the inventor uses carboxy group-modified polyvinyl alcohol or partially saponified polyvinyl alcohol, in addition to completely saponified polyvinyl alcohol. Then, the inventor considers that by binding the coating film and the substrate via their carboxy group or acetic acid group, it is possible to obtain strong adhesion while maintaining the characteristics of polyvinyl alcohol inherent in the film. Polyethyleneimine is used to bond the coating film and the substrate, and by interposing polyethyleneimine between the carboxy group or acetic acid group and the substrate, a strong bond can be obtained between the coating film and the substrate. Thus, the present invention has been provided.

The substrate film 1 and/or gas barrier layer 2 of the water-resistant gas barrier film may contain, if necessary, additives such as antistatic agents, ultraviolet absorbers, plasticizers, and lubricants. Further, at least a surface of the substrate film 1 on the gas barrier layer 2 side may be subjected to modification treatment, such as corona treatment, flame treatment, plasma treatment, or adhesion enhancing treatment. In addition, the water-resistant gas barrier film 10 may further include functional layers, such as a printing layer, a sealant layer, an adhesive layer, and a protective layer, depending on the application of the film.

The gas barrier layer 2 desirably has a thickness of 0.01 to 20 μm. If the thickness is less than 0.01 μm, the barrier properties tend to decrease. If the thickness is more than 20 μm, drying tends to be insufficient during formation of layer, and thus, the suitability for take-up coating may be deteriorated.

(Polyvinyl Alcohol)

As the polyvinyl alcohol, general polyvinyl alcohol can be used. The polyvinyl alcohol can be obtained by polymerizing a vinyl ester monomer, followed by saponification. Examples of the vinyl ester monomer include vinyl formate, vinyl acetate, vinyl propionate, vinyl butyrate, vinyl isobutyrate, vinyl laurate, vinyl stearate, and the like; however, vinyl acetate is generally used.

The polyvinyl alcohol may be modified polyvinyl alcohol that is subjected to copolymerization modification or post-modified. The polyvinyl alcohol that has been subjected to copolymerization modification can be obtained by copolymerizing a vinyl ester monomer with another monomer (unsaturated monomer) that can be copolymerized with the vinyl ester monomer, followed by saponification. The post-modified polyvinyl alcohol can be obtained by polymerizing a vinyl ester monomer, followed by saponification, and then copolymerizing the resulting polyvinyl alcohol with another monomer in the presence of a polymerization catalyst.

Examples of such other monomers include olefins, such as ethylene, propylene, and isobutylene; nitriles, such as acrylonitrile and methacrylonitrile; amides, such as acrylamide and methacrylamide; vinyl chloride, vinylidene chloride, polyoxypropylene, polyoxypropylene vinylamine, and the like.

Moreover, in the case where a carboxy group-modified polyvinyl alcohol is obtained, examples of such other monomers, i.e., carboxy group-containing monomers, include acrylic acid, methacrylic acid, maleic acid, maleic anhydride, itaconic acid, and monoesters of these carboxylic acids. The raw materials of the carboxy group-modified polyvinyl alcohol are desirably a combination of vinyl acetate and a carboxy group-containing monomer. The amount of modification in the carboxy group-modified polyvinyl alcohol (the content ratio of the carboxy group-modified monomer unit to all the monomer units (100 mol %) contained in the carboxy group-modified polyvinyl alcohol) is not particularly limited, but can be set to 1 to 50 mol %.

A polymerization catalyst is used to polymerize the raw material monomer. Examples of the polymerization catalyst include radical polymerization catalysts, such as 2,2-azobisisobutyronitrile, benzoyl peroxide, and lauroyl peroxide. The polymerization method is not particularly limited, and bulk polymerization, emulsion polymerization, solvent polymerization, and the like can be employed.

After being polymerized, the polymer of the raw material monomer is subjected to a saponification step. Saponification can be performed by dissolving the polymer in a solvent containing alcohol and using alkali or acid; however, it is desirable to use alkali, from the viewpoint of saponification rate. Examples of alkalis include alkali metal hydroxides such as sodium hydroxide and potassium hydroxide, and alkali metal alkoxides such as sodium ethylate, potassium ethylate, and lithium methylate. The saponified product, after being saponified (polyvinyl alcohol), can be dried and obtained as a powder.

The saponification degree of the completely saponified polyvinyl alcohol is 98 mol % or more, but may be 99 mol % or more. If the saponification degree of the completely saponified polyvinyl alcohol is 98 mol % or more, sufficient barrier properties are more likely to be obtained. Further, the saponification degree of the partially saponified polyvinyl alcohol can be set to 75 mol % or more and less than 98 mol %, and may be 80 to 95 mol %. If the saponification degree of the partially saponified polyvinyl alcohol is 75 mol % or more, sufficient barrier properties are more likely to be obtained. If the saponification degree thereof is less than 98 mol %, improved or even excellent wettability is more likely to be obtained.

The polymerization degree of the polyvinyl alcohol (partially saponified and completely saponified polyvinyl alcohols) is desirably 300 to 3000 or in the range of 300 or more and less than 3000. If the polymerization degree is less than 300, the barrier properties tend to decrease. If the polymerization degree is larger than 3000, the viscosity is too high, and the coating suitability tends to decrease. Taking consideration of the above, the polymerization degree may be 300 to 1500.

(Polyethyleneimine)

Examples of polyethyleneimine include copolymers of ethyleneimine, such as a linear copolymer containing only a secondary amine, and a branched copolymer containing primary, secondary, and tertiary amines; any of them may be used. Further, a plurality of types of polyethyleneimine may be mixed. In addition, a derivative having a functional group, such as a cationic group, may be used.

The polyethyleneimine desirably has a weight average molecular weight of 500 or more, or 1500 or more. Since polyethyleneimine having an overly low weight average molecular weight tends to penetrate into the film, sufficient water resistance may not be obtained. The upper limit of the weight average molecular weight can be set to 100,000.

<Method for Producing Water-Resistant Gas Barrier Film>

The method for producing the water-resistant gas barrier film is composed of the steps of applying, to a substrate film, a coating liquid comprising (a) at least one of carboxy group-modified polyvinyl alcohol and partially saponified polyvinyl alcohol, (b) completely saponified polyvinyl alcohol, and (c) polyethyleneimine (coating step); and drying the applied coating liquid by heating to form a coating film on the substrate film (heat drying step). This production method may further include the step of stretching the substrate film together with the coating film (stretching step).

(Coating Step)

The required amounts of carboxy group-modified polyvinyl alcohol powder, partially saponified polyvinyl alcohol powder, and completely saponified polyvinyl alcohol powder are weighed, and dissolved in water heated to 80° C. or higher. Aqueous solutions in which these powders are individually dissolved may be prepared in advance. The solid compound of the aqueous solution is not particularly limited, but it is desirable for easy handling that the solid compound is less than 20 mass %. From the viewpoint of coating efficiency or the like, the lower limit of the solid content can be set to 1 mass %.

Polyethyleneimine is further added to the polyvinyl alcohol-containing aqueous solution to obtain a coating liquid. The coating liquid may contain, if necessary, preservatives, alcohols, leveling agents, defoaming agents, ultraviolet absorbers, antioxidants, silane coupling agents, metal chelating agents, and the like.

If at least one of the carboxy group-modified polyvinyl alcohol and the partially saponified polyvinyl alcohol is referred to as component (a), the completely saponified polyvinyl alcohol is referred to as component (b), and polyethyleneimine is referred to as component (c), the amount ratio or the like of the components (a) to (c) in the coating liquid may be appropriately adjusted so that the ratio or the like of the components in the coating film becomes a desired value, for example, one described later.

The coating step can be performed by a coating method using an aqueous solution. A known method can be used as the coating method, and specific examples thereof include wet film forming methods using a gravure coater, a dip coater, a reverse coater, a wire bar coater, a die coater, or the like.

Prior to the coating step, a pre-stretching step of stretching the substrate film in advance can be performed. In particular, in the case where a sequentially stretched film, described later, is obtained, the substrate film is stretched only in a uniaxial direction (e.g., the MD direction) in the pre-stretching step. The stretch ratio can be set to 2 to 20 times.

<Heat Drying Step>

The drying temperature in the heat drying step is desirably 90° C. or higher. There is no problem if the drying temperature is less than 250° C. The dried film thickness of after being coated is preferably 0.01 to 20 μm. The thinner the film is, the faster the processing speed is, and the thicker the film is, the better the barrier properties are. The thickness of the dried film may be appropriately adjusted, as necessary.

In the case where at least one of the carboxy group-modified polyvinyl alcohol and the partially saponified polyvinyl alcohol is referred to as component (a), the completely saponified polyvinyl alcohol is referred to as component (b), and polyethyleneimine is referred to as component (c), the amount of each component in the coating film is preferably adjusted as follows.

In the formed coating film, the total amount of the components (a) and (b) is preferably 90 to 99.9 mass %, and more preferably 95 to 99.5 mass %, with reference to the total amount of the coating film. Further, the ratio of the amount of the component (a) to the total amount of the component (a) and component (b) (the amount of the component (a)/the total amount of the components (a) and (b)) is preferably 0.01 to 0.5, and more preferably 0.02 to 0.4. This makes it easier to maintain improved or even excellent barrier properties and wettability.

In the formed coating film, the content of the component (c) is desirably 10 mass % or less, or 5 mass % or less, with reference to the total amount of the coating film. An overly large amount of the component (c) will lead to a decrease in the barrier properties. The lower limit of the content of the component (c) is 0.01 mass %.

(Stretching Step)

Since the coating film is sufficiently flexible, in this step, the substrate film can be stretched together with the coating film. Stretching is performed to control the heat shrinkage characteristics. In the stretching step, the substrate film is stretched by a predetermined ratio at a temperature equal to or higher than the Tg thereof. The stretch ratio can be 2 to 20 times, and may be 3 to 10 times. If the stretch ratio is less than 2 times, the shrinkage characteristics do not change much, and if the stretch ratio is more than 20 times, some films may be torn. In the present manufacturing method, in-line barrier coating is possible, because the substrate film can be stretched after the coating film is formed. Therefore, a water-resistant gas barrier film can be obtained at low cost by the above manufacturing method.

The water-resistant gas barrier film obtained by the above manufacturing method may also be obtained by forming a coating film on a substrate film that is pre-stretched, if necessary, in a uniaxial direction (e.g., the MD direction), and then stretching them in another uniaxial direction (e.g., the TD direction). The film obtained in such a step is not biaxially and simultaneously stretched but is sequentially stretched. Thus, it denotes a sequentially stretched film.

After the stretching step, a post-heating step may be carried out, if necessary.

EXAMPLES

The invention is more particularly described by way of examples, to which the invention should not be construed as being limited.

<Production of Film>

[Preparation of Carboxy Group-Modified Polyvinyl Alcohol Aqueous Solution (a1)]

Vinyl acetate and maleic acid were polymerized using 2,2-azobisisobutyronitrile as a catalyst. The resulting polymer was saponified with aqueous sodium hydroxide (containing methanol), followed by drying at 80 degrees, thereby obtaining a carboxy group-modified polyvinyl alcohol powder (a1). The powder was dissolved in water at 90° C.

[Preparation of Partially Saponified Polyvinyl Alcohol Aqueous Solution (a2)]

Vinyl acetate was polymerized using 2,2-azobisisobutyronitrile as a catalyst. The resulting polymer was partially saponified with aqueous sodium hydroxide (containing methanol), and then dried at 80 degrees. Thereby, (a2) a partially saponified polyvinyl alcohol powder having a polymerization degree of 1000 was obtained. The degree of saponification was 87 mol %. The powder was dissolved in water at 90° C.

[Preparation of Completely Saponified Polyvinyl Alcohol Aqueous Solution (b)]

Vinyl acetate was polymerized using 2,2-azobisisobutyronitrile as a catalyst. The resulting polymer was saponified with aqueous sodium hydroxide (containing methanol), and then dried at 80 degrees. Thereby, a completely saponified polyvinyl alcohol powder (b) having a polymerization degree of 500 was obtained. The degree of saponification was 98 mol % or more. The powder was dissolved in water at 90° C.

[Preparation of Polyethyleneimine (c)]

Several types of polyethyleneimine having different weight average molecular weights were prepared.

[Preparation of Coating Liquids]

Various polyvinyl alcohol aqueous solutions and various types of polyethyleneimine were weighed so that the amounts of each polyvinyl alcohol and polyethyleneimine satisfied the ratios shown in Table 1. Then, they were mixed for 10 minutes or more. A coating liquid used for each example was thus obtained. The total content (solid content) of carboxy group-modified polyvinyl alcohol (a1) or partially saponified polyvinyl alcohol (a2) and completely saponified polyvinyl alcohol (b) in the coating liquid was adjusted to 10 mass % with reference to the total amount of the coating liquid.

Example 1

Carboxy group-modified polyvinyl alcohol (a1) and completely saponified polyvinyl alcohol (b) were mixed at a mass ratio of about 1:2, and polyethyleneimine with a weight average molecular weight of 1800 was added thereto. Thus, a coating liquid was prepared. The added amount of polyethyleneimine was adjusted so that the content thereof in a coating film was 2 mass %. The coating liquid was applied by a bar coating method to a polyethylene terephthalate film substrate with a thickness of 12 μm (P60, produced by Toray Industries, Inc.). Then, the coating liquid was cured by drying at 150° C. for 3 minutes. Thus, the coating film having a thickness of 200 nm was formed on the substrate.

Example 2

Carboxy group-modified polyvinyl alcohol (a1) and completely saponified polyvinyl alcohol (b) were mixed at a mass ratio of about 1:2, and polyethyleneimine having a weight average molecular weight of 10000 was added thereto. Thus, a coating liquid was prepared. The added amount of polyethyleneimine was adjusted so that the content thereof in a coating film was 1 mass %. Subsequently, the coating film was formed on a substrate in the same manner as in Example 1.

Example 3

A coating film was formed on a substrate in the same manner as in Example 2, except that partially saponified polyvinyl alcohol (a2) was used in place of the carboxy group-modified polyvinyl alcohol (a1).

Example 4

A coating film was formed on a substrate in the same manner as in Example 2, except that a non-stretched polypropylene film substrate having a thickness of 20 μm was used in place of the polyethylene terephthalate film substrate having a thickness of 12 μm. Subsequently, the non-stretched polypropylene film substrate was stretched in the TD direction together with the coating film. The stretch ratio was set to 3 times.

Example 5

A coating film was formed on a substrate in the same manner as in Example 1, except that polyethyleneimine having a weight average molecular weight of 10000 was used in place of the polyethyleneimine having a weight average molecular weight of 1800, and a non-stretched polyethylene terephthalate film substrate having a thickness of 150 µm was used in place of the polyethylene terephthalate film substrate having a thickness of 12 µm. Subsequently, the non-stretched polyethylene terephthalate film substrate was stretched in the TD direction together with the coating film. The stretch ratio was set to 3 times.

Example 6

A coating film was formed on a substrate in the same manner as in Example 1, except that polyethyleneimine having a weight average molecular weight of 600 was used in place of the polyethyleneimine having a weight average molecular weight of 1800.

Example 7

A coating film was formed on a substrate in the same manner as in Example 2, except that the added amount of polyethyleneimine was adjusted so that the content thereof in the coating film was 10 mass %.

Comparative Example 1

A coating film was formed on a substrate in the same manner as in Example 1, except that a coating liquid only containing completely saponified polyvinyl alcohol (b) was used.

TABLE 1

| | Substrate | Formulation ratio (mass ratio) (a1) | (a2) | (b) | Added amount (c) | Molecular weight | Stretching |
|---|---|---|---|---|---|---|---|
| Example 1 | PET | 33 | — | 67 | 2 mass % | 1800 | — |
| Example 2 | PET | 33 | — | 67 | 1 mass % | 10000 | — |
| Example 3 | PET | — | 33 | 67 | 1 mass % | 10000 | — |
| Example 4 | PP | 33 | — | 67 | 1 mass % | 10000 | 3 times |
| Example 5 | PET | 33 | — | 67 | 2 mass % | 10000 | 3 times |
| Example 6 | PET | 33 | — | 67 | 2 mass % | 600 | — |
| Example 7 | PET | 33 | — | 67 | 10 mass % | 10000 | — |
| Comparative Example 1 | PET | — | — | 100 | — | — | — |

<Performance Evaluation of Films>

The performance of the films was evaluated in accordance with the following methods. Table 2 shows the results.

[Water-Resistant Adhesion]

The coating film surface of the produced film was bonded with a cast polypropylene (CPP) film through an adhesive, and the resultant was cut into a 15 mm×100 mm piece to obtain a sample. After a peeled surface was exposed, the sample was dipped in water, and the laminate strength was measured according to JIS Z 1707. The measurement conditions were a peeling speed of 300 m/min and a peeling angle of 180 degrees. The water-resistant adhesion can be evaluated as improved or even excellent if the laminate strength is 1.0 N or more.

[Oxygen Permeability]

The oxygen permeability of the produced film was measured under the conditions of 30° C. and 70 RH % using differential gas chromatography in accordance with the method of JIS K 7129 C method. It can be evaluated that the barrier properties are good if the oxygen permeability is 50 (cc/m2·day·atm) or less, and the barrier properties are improved or even excellent if the oxygen permeability is 15 (cc/m2·day·atm) or less.

TABLE 2

| | Water-resistant adhesion | Oxygen permeability (cc/m2 · day · atm) |
|---|---|---|
| Example 1 | >2N | 10 |
| Example 2 | >2N | 7 |
| Example 3 | >2N | 7 |
| Example 4 | >2N | 30 |
| Example 5 | 2N | 10 |
| Example 6 | 1.2N | 9 |
| Example 7 | >2N | 40 |
| Comparative Example 1 | 0.8N | 2 |

As shown in Table 2, the films in the examples had both improved or even excellent water-resistant adhesion and barrier properties. The film in the comparative example had excellent barrier properties. However, water-resistant adhesion was inferior to the examples.

The above results reveal that the water-resistant gas barrier films in the present invention had improved or even excellent water-resistant adhesion and improved or eve excellent barrier properties.

REFERENCE SIGNS LIST

1 . . . Substrate film; 2 . . . Gas barrier layer; 10 . . . Water-resistant gas barrier film.

What is claimed is:

1. A water-resistant gas barrier film, consisting of a substrate film, which is a polyethylene terephthalate film or a polypropylene film, and a coating film disposed on the substrate film, wherein the coating film consists of:
    (a) carboxy group-modified polyvinyl alcohol, (b) completely saponified polyvinyl alcohol having a polymerization degree of 3000 or less, and (c) polyethyleneimine, and wherein a mass ratio between the carboxy group-modified polyvinyl alcohol and a sum of the carboxy group-modified polyvinyl alcohol and the completely saponified polyvinyl alcohol in the coating film is from 0.02 to 0.4, wherein the water-resistant gas barrier film is a stretched film such that the substrate film and the coating film are stretched together in a first direction with a stretching ratio from 3-10 times, and wherein a content of the polyethyleneimine is from 1 mass % to 5 mass % with respect to a total mass of the coating film.

2. The water-resistant gas barrier film of claim 1, wherein the substrate film is pre-stretched in a second direction, which is different from the first direction.

3. The water-resistant gas barrier film of claim 1, wherein the substrate film is a polyethylene terephthalate film.

4. The water-resistant gas barrier film of claim 2, wherein the substrate film is a polyethylene terephthalate film.

5. The water-resistant gas barrier film of claim 1, wherein the stretching ratio is 3.

* * * * *